United States Patent Office 3,772,406
Patented Nov. 13, 1973

3,772,406
PREPARATION OF POLYHALOGENATED POLYESTERS FROM POLYHALOCYCLO-PENTADIENES, CARBOXYLIC COMPOUNDS AND POLYOLS OR POLYOL FORMING MATERIALS
Brian M. Rushton, Williamsville, Jerold C. Rosenfeld, Tonawanda, and Raymond R. Hindersinn, Lewiston, N.Y., assignors to Hooker Chemical Corporation, Niagara Falls, N.Y.
No Drawing. Filed Aug. 17, 1971, Ser. No. 172,595
Int. Cl. C08f 21/02; C08g 17/10
U.S. Cl. 260—869
24 Claims

ABSTRACT OF THE DISCLOSURE

An improved process for the preparation of unsaturated polyesters is provided. The process comprises the steps of forming a 1:1 adduct of a polyhalogenated cyclopentadiene and maleic anhydride by heating a mixture of these components, in which the latter is present in excess, in an atmosphere of an oxygen containing gas, then after replacing the oxygen containing gas atmosphere with one of an inert gas, heating the adduct containing excess maleic anhydride with a polyol or a polyol forming material, such as an alkylene oxide, to form an unsaturated polyester composition which is co-polymerizable with ethylenic monomers, such as styrene. The resultant co-polymers are infusible, insoluble, light colored resins and are useful as fire retardant resins.

FIELD OF INVENTION

This invention relates to improvements in the preparation of unsaturated polyester compositions which include a chemically combined component to impart fire retardant character to the polyester composition, said component being an adduct of a polyhalogenated cyclopentadiene and an unsaturated polycarboxylic acid anhydride. More particularly, it relates to improvements in the preparation of unsaturated polyester compositions which include the adduct of hexachlorocyclopentadiene and maleic anhydride as the component imparting fire retardant character to the polyester.

BACKGROUND OF THE INVENTION

The production of infusible, insoluble polyester resins which are fire retardant and have high resistance to heat is of considerable industrial importance. For instance, castings, moldings, formed articles, or laminated structures bonded by polyester resins are, for many applications, required, or at least desired, to be resistant to fire and should endure heat without contributing fuel to the fire. For example, castings for live electrical contacts, structural members, pipes, wall coverings, panels, ash trays etc., should be fire retardant and/or should not support combustion.

It is well known in this art to prepare fire retardant polyester resins by combining halogenated chemical adducts with polyols. For example, it is known that the maleic anhydride halogenated cyclopentadiene Diels-Alder adduct when admixed with alpha-beta unsaturated dicarboxylic acids and anhydrides will react with glycols to form resinous polyester compositions which may be made insoluble and infusible by further reaction with co-polymerizable olefins to form a cross-linked polymer. It is known further that such resins are often highly colored and may contain noxious or irritating contaminants which detract from their commercial acceptability. Such defects severely limit their fields of application.

A principal source of the color forming and irritating impurities in these polyesters are introduced in the polyhalogenated cyclopentadiene used in preparing the Diels-Alder adducts. Various procedures for improving these adducts have been proposed. Thus, according to U.S. Pat. 3,112,339, chlorendic acid, the 1:1 adduct of hexachlorocyclopentadiene and maleic acid, is obtained in light color and high purity by crystallizing the crude chlorendic acid from a substantially immiscible solvent pair consisting of water and an organic solvent. It has also been proposed, according to U.S. Pat. 3,214,444 to purify chlorendic anhydride by contacting the crude anhydride with a substance capable of forming a constant boiling azeotrope with the chlorocarbon impurities contained in the anhydride adduct, and distilling off the azeotrope from the chlorendic anhydride. It is also known to purify Diels-Alder adducts by repeated recrystallization from organic solvents or by hydrolysis of the anhydride with alkaline agents, recrystallization of the alkali metal salts of the acid, acidification, and dehydration to recover the purified anhydride.

Although these prior art methods are useful in certain applications they are not economically adapted to commercial operation. This is especially true in the many areas of application of fire retardant resins where low cost as well as high quality are prime considerations.

OBJECTS OF THE INVENTION

It is, therefore, a principal object of the present invention to devise a process for the preparation of fire retardant polyester resin compositions which is inexpensive, simple, and direct and which is adaptable to large scale commercial operations.

A more specific object is to devise an improved process for the preparation of unsaturated polyester resin compositions containing chlorendic acid as an essential component.

Other objects will be apparent to those skilled in this art from the following description of the invention.

As used herein, chlorendic anhydride is the Diels-Alder adduct of hexachlorocyclopentadiene and maleic anhydride and is chemically 1,4,5,6,7,7-hexachlorobicyclo (2.2.1)-5-heptene-2,3-dicarboxylic anhydride.

SUMMARY OF THE INVENTION

In accordance with the present invention, we have found that if the Diels-Alder adduct of the halogenated cyclopentadiene and the ethylenically unsaturated polycarboxylic anhydride is prepared by heating a mixture of these components containing an excess of the dicarboxylic anhydride over that theoretically required to form the 1:1 adduct, in an atmosphere of an oxygen containing gas and thereafter the oxygen containing gas atmosphere is replaced with one containing an inert gas, the resultant adduct mixture can be reacted with an esterifying agent, i.e., a polyol or an alkylene oxide, to form, directly, the halogenated unsaturated polyester without expensive purification of the intermediates. This polyester can be admixed with an ethylenic monomer and the resultant mixture co-polymerized to form insoluble and infusible resins which are light colored and possess a high degree of fire retardance.

DETAILED DESCRIPTION OF THE INVENTION

As is known, the polyester product obtained from the pure adduct of polyhalogenated cyclopentadiene and maleic anhydride, although it contains olefinic linkages is unreactive in the copolymerization reaction with ethylenic monomers, or other olefinic cross linking agents, such as styrene, divinyl compounds, diallyl compounds and the like. However, by carrying out the adduction reaction in the presence of an excess quantity of the dienophile component, the polycarboxylic anhydride, the excess of this component not only serves to drive the adduction reaction more nearly to completion, but also reacts with the polyol component to form polyesters which render the polyester compositions containing the Diels-Alder adduct containing polyesters copolymerizable with the ethylenic monomers. The excess of the unsaturated polycarboxylic anhydride also serves to maintain the reaction mixture liquid and stirrable.

The reaction between the halogenated cyclopentadiene and excess of the polycarboxylic anhydride is carried out in an atmosphere of an oxygen containing gas, such as oxygen, air, or substances which under the influence of heat decomposes to liberate oxygen. Preferably air is used because of its effectiveness, low cost, and ready availability. The oxygen containing gas may be added continuously during the adduction reaction, for example, by passing a slow steady stream of air or oxygen through the reaction mass, or by substantially saturating the reaction vessel containing one or both of the reactants at the inception of the reaction.

The adduction reaction can be carried out at temperatures within the range of about 100 degrees centigrade and about 200 degrees centigrade. Preferably this reaction is effected at temperatures within the range of about 130 degrees and about 160 degrees centigrade. The reaction normally requires from about 3 to about 8 hours, depending upon the batch size and temperature, to proceed essentially to completion. As is known the reaction between hexachlorocyclopentadiene and maleic anhydride, which, at 150 degrees centigrade, is more than 50 percent completed in the first hour, is difficult, if not impossible, to carry to complete consumption of the chlorocarbon even after seven or eight hours. The presence of an excess of maleic anhydride improves the yield of Diels-Alder adduct with respect to the consumption of the chlorocarbon.

It is preferred to utilize an excess of the polycarboxylic anhydride reactant in this step of our improved process. Preferably from about 1.1 to 2.0 moles of the anhydride per mole of halocarbon are used and especially from about 1.4 to 1.8 moles of anhydride per mole of halocarbon are used.

Although hexachlorocyclopentadiene is the preferred halocarbon reactant, cyclopentadienes containing other halogens such as fluorine, bromine, and mixtures thereof with chlorine can be used, such as hexabromocyclopentadiene, 5,5 - difluorotetrachlorocyclopentadiene, and the like.

It is preferred to utilize the halogenated cyclopentadiene component in a highly purified state. These compounds can be purified according to methods known in the art. For example, hexachlorocyclopentadiene can be purified by fractional distillation under reduced pressure to obtain material of 98 percent or higher purity. Thus crude hexachlorocyclopentadiene can be distilled through a two foot column packed with glass tubing or Raschig rings, under a vacuum of about 20 mm. pressure to obtain a purified product boiling at about 125 degrees centigrade and analyzing at least about 98.5 percent and usually from about 98.7 to 99.5 percent by weight of hexachlorocyclopentadiene.

Maleic anhydride is the preferred polycarboxylic anhydride. Other dienophiles can be used such as tetrahydrophthalic, itaconic, and citraconic anhydrides, as well as the free acids of these anhydrides and mixtures thereof.

The reaction mixture containing the Diels-Alder adduct and excess of the polycarboxylic anhydride is used directly in the esterification step of our process. Additional dicarboxylic acid or anhydride may be added to the mixture prior to, or during, the polyesterification step.

It is, however, an essential step in our improved process, that the atmosphere of the oxygen containing gas in which the adduct mixture has been formed be replaced by an atmosphere of an inert gas, such as nitrogen, carbon dioxide, and the like, prior to the addition of the polyesterifying component to the adduct mixture. This step has been found to be essential if one is to obtain polyesters of acceptable light color, without resorting to tedious and expensive purification methods, including azeotropic distillation of the crude adduct mixture.

This step of replacing the atmosphere can be carried out by simply flushing the vessel containing the adduct mixture with a current of the inert gas. Alternatively the process can be expedited by alternately evacuating the reaction flask and refilling with inert gas several times.

The crude adduct mixture also can be transferred to a vessel which has been flushed with inert gas, and the polyesterified agent added. Other methods of replacing the oxygen containing atmosphere with an inert gas atmosphere will be obvious to those skilled in the art.

The polyesterification is effected by means of a reactant which will form esters with the acid groups of the adduct containing mixture. Such reactants include polyols and alkylene oxides having from 2 to 6 carbon atoms.

Example of the polyhydric alcohols which can be used for this step include the following:

ethylene glycol
diethylene glycol
1,2-propylene glycol
dipropylene glycol
1,4-butanediol
1,4-butylenediol
1,3-butanediol
1,5-pentanediol
1,6-hexanediol
neopentyl glycol
glycerine
trimethylol propane Mixtures of these and equivalent polyols are contemplated also.

As examples of the alkylene oxides which can be used the following are mentioned.

ethylene oxide
1,2-propylene oxide
1,3-propylene oxide
1,2-butylene oxide
2,3-butylene oxide
2,3-pentylene oxide
1,2-hexylene oxide
1,2-dodecylene oxide
styrene oxide
methyl styrene oxide
methyl glycidyl oxide
phenyl glycidyl oxide
cyclohexane monooxide
vinyl cyclohexane monooxide
allyl glycidyl ether Mixtures of these and equivalent oxides are contemplated also.

The temperature for carrying out the esterification reaction ranges between about 100 degrees and about 200 degrees centrigrade, although higher or lower temperatures can be used. Advantageously the reaction is carried out between about 150 degrees and about 180 degrees centigrade.

Following admixture of the polyesterifying agent to the adduct mixture, which is effected in an atmosphere of inert gas, the inert gas can be passed through the reaction mass to accelerate the progress of the esterification reaction.

The progress of the reaction can be followed by collecting and measuring the water liberated, by acid number and viscosity of the resin, or by other methods known in this art. The extent to which the reaction is carried out will depend upon a number of factors, such as the desired viscosity, melting point, duration of the reaction, and the like.

An azeotroping solvent, such as xylene, may be present in the reaction mixture, to facilitate removal of the water produced in the reaction.

Esterification catalysts, such as para-toluenesulfonic acid, benzenesulfonic acid, beta naphthalene sulfonic acid, phosphoric acid, amines such as pyridine, triethylamine, quinoline, and the like, may be added to the reaction mixture.

The proportion of polyhydric alcohol used is controlled approximately by the proportion of acids or anhydrides in the esterification reaction mixture. In general, we prefer to react this essential component in approximately equimolecular proportions. However either the acids or alcohols may be present in excess, to prepare polyesters of desired molecular weight, viscosity, acid number, and the like.

When using alkylene oxides as the source of the polyol, the reaction is somewhat more complex. As is well known in this art, the alkylene oxides react with carboxyl groups to form initially hydroxy esters of the carboxylic acids. These hydroxy esters may react with additional carboxylic anhydrides to form polyester linkages. Also, the hydroxy esters may react with additional alkylene oxide to form polyethers terminated by hydroxyl groups. This latter reaction can be controlled by the use of catalysts or chain initiators, the rate of addition of alkylene oxide and similar well known factors. In general, we prefer to effect this reaction of the alkylene oxide and carboxylic anhydride in the presence of an initiator, e.g., glycol, water and the like, which is added at the inception of the reaction, and to add about an equimolecular proportion of the alkylene oxide. However, as in the instance of the polyhydric alcohols, either the acid, alkylene oxide, may be present in excess, to prepare polyesters of desired molecular weight, viscosity, acid number, and the like. Molecular weight of the polyester can also be controlled by the amount of chain initiator added.

The properties, specifically the flexibility of the polyester resins and the co-polymerized resins obtained therefrom can be controlled to a significant degree by the choice of polyesterification agent used. Thus polyester resins having a relatively high degree of flexibility are produced by utilizing alkylene oxides as the source of the polyols for the esterification. Such polyesters are eminently useful for the preparation of resins to be used as wall coverings, wire coatings and similar applications where flexibility is an important characteristic. It is believed that this high degree of flexibility in the resultant resins is due to relatively low temperature required in the esterification step, which limits the extent of the isomerization of maleic to fumaric moieties which occurs during this step. We have found that the ratio of fumaric to maleic moieties is exceedingly low in polyesters formed when alkylene oxides are used as the source of polyol component.

Conversely, polyesters obtained using glycols as the esterifying polyols contain a relatively high ratio of fumaric to maleic moieties. Such resins are relatively brittle. It is known to modify such resins by inclusion of glycols such as diethylene glycol, tetramethylene glycol and the like, to impart a more flexible character to such resins. However, such additions add to the cost of the resultant resin and accordingly it is economically more attractive, when preparing polyesters for applications where flexibility is a desirable attribute to utilize alkylene oxides as the source of the polyol component.

Inasmuch as alkylene oxides are basically cheaper than the corresponding glycols, it is often desirable to prepare the polyesters utilizing alkylene oxides as the source of the glycol component, and to add fumaric acid or fumaric acid containing initiator to the adduct mixture, thereby introducing hardness and less flexibility to the resultant polyester composition which results in a more economic process.

Alternatively, the isomerization of the maleic to fumaric moieties can be effected by heating the polyester reaction mass at a relatively high temperature, e.g., about 160 to about 200 degrees centigrade, in the presence of a suitable catalyst e.g., phosphoric acid, if desired.

The resultant ethylenically unsaturated polyester can be cured by copolymerizing with an ethylenically unsaturated monomeric material copolymerizable therewith, preferably in the presence of a catalytic amount of a conventional polymerization catalyst such as a free radical catalyst of which benzoyl peroxide is an example.

The ethylenically unsaturated monomers which can be used for this copolymerization reaction can be varied widely. The monomers which can be used include vinylidene compounds or mixtures thereof capable of crosslinking ethylenically unsaturated polymer chains at their points of unsaturation and usually they contain the reactive group

Specific examples include styrene
    chlorostyrenes
    methylstyrenes, such as alpha methyl styrene.
    p-methylstyrene
    divinylbenzenes
    methylmethacrylate
    methyl acrylate
    allyl acetate
    vinyl acetate
    diallyl sebacate
    diethylene glycol bis (allylcarbonate)
    triallyl phosphate
    diallylbenzene phosphonate
    diallyl chlorendate
    diallyl tetrachlorophthalate Mixtures of these and equivalent materials are contemplated also.

The monomer, or mixture thereof, can be admixed with the polyester in an amount sufficient to produce a crosslinked polymer and the mixture heated, in the presence of a suitable catalyst, to an elevated temperature to crosslink or cure the polymer mixture. With proper catalyst systems such as cobalt naphthenate and methyl ethyl ketone peroxide, room temperature cures can be obtained.

To prevent premature polymerization at this stage, a polymerization inhibitor, such as hydroquinone, is advantageously added to the mixture, or preferably to one of its components prior to mixing, especially if the curable mixture is to be stored or shipped in commerce prior to curing or effecting the co-polymerization reaction.

In order that this invention may be more readily understood and to further illustrate the details thereof, the following examples which show the preferred manner of carrying out the improved process are given. Parts and percentages are by weight and temperatures are given in degrees centigrade, unless otherwise specified.

EXAMPLE 1

(A) Preparation of adduct

Molten maleic anhydride, 672 parts (6.87 moles) was heated at 140 degrees as a current of oxygen was passed over the surface of the molten mass for about ten minutes. Thereafter 1118 parts (4.1 moles) of hexachlorocyclopentadiene (98.7% pure, boiling point 125 degrees at 21 mm. pressure) were added to the molten anhydride at a rate sufficient to maintain the mixture at 150 to 155 degrees. The addition required about fifteen minutes. The mixture was heated at about 150 degrees for an additional 3.5 hours and then the pale yellow mass was cooled to ambient temperature in an atmosphere of nitrogen. The adduct mixture containing excess maleic anhydride was pulverized in a dry box.

(B) Preparation of polyester

A mixture of 1174 parts of the adduct mixture prepared in Part A above and 0.47 part of lithium chloride was heated to about 120 degrees in an atmosphere of nitrogen and 49 parts (0.79 mole) of ethylene glycol were added over a period of about nine minutes. The mixture was agitated for about ten minutes and 164 parts (3.73 moles) of liquid ethylene oxide were added over a period of about 64 minutes. The temperature of the mixture during the addition varied over the range of 117 to 148 degrees. At the end of the ethylene oxide addition, the reactor pressure was about 45 p.s.i. The mixture was heated at about 125 degrees for about 15 minutes and then the product discharged into a glass tray. The yield of product was 1389 parts. The polyester product had an acid number of 34 and a fumaric acid/maleic acid ratio of 0.12.

(C) Preparation of copolymer

A mixture of 100 parts of the polyester prepared in Part B above 40 parts of styrene and 0.0148 part of toluene hydroquinone was prepared. This solution had the following properties Color—1–2 (Gardner)
Viscosity at 25 degrees—849 centipoises
Mol. wt. (VPO)—1353
SPI gel time—5.48 minutes
Peak exotherm—167 degrees
Time to peak exotherm—9.88 minutes.

Castings ⅛ inch thick were prepared from this mixture in a steel mold, using one percent of benzoyl peroxide as catalyst, and a curing cycle of 50 degrees for sixteen hours, 80 degrees for two hours, 100 degrees for four hours and 130 degrees for sixteen hours. The resulting copolymerized resin had a Barcol Hardness of 37 and a heat distortion point according to ASTM D–648 of 85.5 degrees.

EXAMPLE 2 (COMPARATIVE EXAMPLE)

Molten maleic anhydride, 224 parts (2.28 moles) was heated to 150 degrees and the reaction vessel containing the molten anhydride was thoroughly flushed out with nitrogen. Freshly distilled hexachlorocyclopentadiene, 353 parts (1.29 moles) was added to the molten anhydride at 150 degrees, and the mixture was heated at 150±3 degrees for about four hours.

Thereafter 131 parts (2.11 moles) of ethylene glycol and 30 parts (0.28 mole) of diethylene glycol were added to the hot crude adduct mixture. A slow current of nitrogen was passed through the reaction mixture to assist in the removal of the water of esterification. The mass was heated to 170 degrees. When the acid number of the mixture decreased to about 70, 0.1 part of toluene hydroquinone was added and heating continued until the acid number decreased to about 50. The mass then was cooled to about 145 degrees and 286 parts (2.75 moles) of styrene were added. The mixture was agitated and cooled to ambient temperature. The resulting solution had a color of 14 (Gardner).

EXAMPLE 3 (COMPARATIVE EXAMPLE)

Repetition of the above experiment with the single exception that the adduction reaction was carried out in an atmosphere of air rather than an atmosphere of nitrogen resulted in a styrenated polyester resin having Gardner color of 8.

EXAMPLE 4 (COMPARATIVE EXAMPLE)

Repetition of the procedure essentially as described in Experiment 2 above, with the exception that the adduction reaction was carried out by thoroughly flushing the reaction vessel containing the molten maleic anhydride with oxygen prior to addition of the hexachlorocyclopentadiene resulted in a styrenated polyester resin having a Gardner color 9.

EXAMPLE 5

The procedure of Example 4 was repeated with the following changes:

(1) The crude adduction mixture was thoroughly flushed with nitrogen prior to the addition of the glycols.

(2) Following the addition of glycols to the crude adduct mixture in the inert atmosphere, the reaction mixture was heated at 150 to 170 degrees until the acid number decreased to about 50 at which time the toluene hydroquinone stabilizer was added, and (3) The polyester reaction was continued to an acid number of 32, prior to addition of the styrene.

The Gardner color of the resulting styrenated polyester resin product was 3. The solution had a viscosity of 1875 cps. at 25 degrees, an SPI gel time of 7.24 minutes and a peak exotherm of 195 degrees. On curing to a temperature of 130 degrees in the presence of one percent of benzoyl peroxide, the copolymerized product had a heat distortion temperature of 95.3 degrees and a Barcol Hardness of 46.

EXAMPLE 6

The procedure of Example 5 was repeated with the following changes:

(1) The adduction step was carried out in an atmosphere of air instead of oxygen.

(2) The adduction was carried out by adding molten maleic anhydride to the hexachlorocyclopentadiene at about 150 degrees.

The Gardner color of the styrenated polyester resin was 3. The other physical characteristics were as follows:

Viscosity at 25 degrees—1716 cps.
SPI gel time—6.20 minutes
Peak exotherm—196 degrees
Heat distortion temperature [1]—95.3 degrees
Barcol Hardness [1]—46.

[1] Of resin cured with one percent benzoyl peroxide to 130 degrees.

Examples 2 through 6 illustrate the surprising beneficial effect on the color the styrenated polyester resin of the step of replacing the atmosphere of oxygen containing gas in which the adduct was formed with an inert atmosphere prior to the addition of the esterifying glycols. It was also shown that formation of the crude adduct in an inert atmosphere (Example 2) resulted in a dark resin (color of 14) whereas by forming the adduct in an oxygen containing gas (Example 3) resulted in an improvement in the color of the resin (color of 8). In Example 3, the glycols were charged to the adduct in the presence of the oxygen containing gas, as is customary in conventional polyester processes.

However, when the oxygen containing atmosphere is replaced with an inert gas prior to the addition of the glycol component, the color of the resin product is improved significantly, as shown in Examples 5 and 6.

In the above examples, the hexachlorocyclopentadiene used was a relatively pure product obtained by distilling the commercial grade material. The latter has an average composition of from 97 to 98 percent hexachlorocyclopentadiene, about one percent of hexachlorobutadiene and about one percent of octachlorocyclopentene. The distilled product, used in these examples, contains from about 98.7 to about 99.5 percent hexachlorocyclopentadiene, about 0.4 percent of hexachlorobutadiene and about 0.1 percent of octachlorocyclopentene.

We have found that the commercial grade of hexachlorocyclopentadiene when used to prepare the Diels-Alder adduct results not only in a more highly colored product which contains noxious and irritative impurities, but also an adduct which is more difficult to esterify as indicated by the slowness of the acid number decrease. Further, when the acid number of the polyester resin derived from this impure adduct decreases to about 25 to 35, the polyester resins become quite viscous and often gels when admixed with the ethylenic monomer, even in the presence of hydroquinone stabilizers.

This invention has been described and illustrated by reference to certain specific embodiments. It will how-

What is claimed is:

1. In the process for preparing an unsaturated polyester which is copolymerizable with an ethylenically unsaturated monomer which comprises the steps of forming a Diels-Alder adduct of a polyhalogenated cyclopentadiene and an alpha,beta-unsaturated polycarboxylic acid or anhydride thereof by heating, at a temperature of about 100° C. to about 200° C., a mixture of the cyclopentadiene compound with an excess of the polycarboxylic compound, and polyesterifying the resultant adduct mixture by heating said adduct mixture with an esterifying agent of the group consisting of polyols and alkylene oxides, the improvement which comprises carrying out the adduction step in an atmosphere of an oxygen containing gas, replacing the atmosphere of oxygen containing gas with an atmosphere of an inert gas when the adduction step is substantially complete and before the addition of said esterifying agent.

2. The process of claim 1 in which the polyhalogenated cyclopentadiene is a polychlorinated cyclopentadiene.

3. The process of claim 2 in which the polychlorinated cyclopentadiene is hexachlorocyclopentadiene.

4. The process of claim 3 in which the hexachlorocyclopentadiene is a purified hexachlorocyclopentadiene containing at least about 98.5 percent by weight of hexachlorocyclopentadiene.

5. The process of claim 1 in which the alpha-beta unsaturated polycarboxylic anhyride is maleic anhydride.

6. The process of claim 5 in which the maleic anhydride is present in an amount of from about 1.1 to 2.0 per mole of halocarbon used.

7. The process of claim 6 in which the maleic anhydride is present in an amount within the range of from about 1.4 to 1.8 moles per mole of halocarbon used.

8. The process of claim 7 in which the polyhalogenated cyclopentadiene is a polychlorinated cyclopentadiene.

9. The process of claim 8 in which the polychlorinated cyclopentadiene is hexachlorocyclopentadiene.

10. The process of claim 8 in which the hexachlorocyclopentadiene is a purified hexachlorocyclopentadiene containing at least about 98.5 percent by weight of hexachlorocyclopentadiene.

11. The process of claim 10 in which the said mixture is heated at temperatures within the range of about 130 degrees to about 160 degrees centigrade.

12. The process of claim 1 in which the oxygen containing gas is a member of the group consisting of oxygen and air.

13. The process of claim 12 in which the oxygen containing gas is oxygen.

14. The process of claim 1 in which the inert gas is nitrogen.

15. The process of claim 1 in which the esterifying agent is an alkylene oxide.

16. The process of claim 15 in which the alkylene oxide is ethylene oxide.

17. The process of claim 16 in which the adduct mixture and ethylene oxide is heated at a temperature within the range of about 100 degrees and about 200 degrees centigrade.

18. The process of claim 1 in which the esterifying agent is a polyol.

19. The process of claim 18 in which the polyol is a glycol.

20. The process of claim 19 in which the glycol is ethylene glycol.

21. The process of claim 18 in which the adduct mixture and polyol is heated at a temperature within the range of about 100 degrees and about 200 degrees centigrade.

22. The process of claim 21 in which the adduct mixture and polyol is heated at a temperature within the range of about 150 degrees and about 180 degrees centigrade.

23. The process which comprises the steps of
(1) heating a mixture of about one mole equivalent of a purified hexachlorocyclopentadiene containing at least about 98.5 percent by weight of hexachlorocyclopentadiene and from 1.1 to 2.0 mole equivalents of maleic anhydride at a temperature of about 100 to about 200 degrees centigrade in an atmosphere of an oxygen containing gas,
(2) flushing the oxygen containing gas from the reaction vessel with nitrogen,
(3) heating the reaction mixture of step 2 at a temperature of about 100 to about 200 degrees centigrade with ethylene oxide thereby to form a polyester, and
(4) dissolving an ethylenically unsaturated monomer which is copolymerizable with the polyester, in said polyester.

24. The process of claim 23, wherein the ethylenically unsaturated monomer is styrene.

References Cited

UNITED STATES PATENTS

| 2,890,144 | 6/1959 | Robitschek et al. | 154—43 |
| 3,367,905 | 2/1968 | Zimberg et al. | 260—45.7 |

OTHER REFERENCES

Bjorksten, "Polyesters," Reinhold, New York, 1956 (pp. 37–38).

MELVIN GOLDSTEIN, Primary Examiner

U.S. Cl. X.R.

260—75 A, H, UA